United States Patent [19]

Di-Martino et al.

[11] Patent Number: 5,417,924

[45] Date of Patent: May 23, 1995

[54] APPARATUS CONNECTIBLE TO A RECEPTACLE FOR CONDENSING FUMES GENERATED DURING CHEMICAL REACTIONS

[75] Inventors: Jean-Louis Di-Martino; Eric Quentin, both of Briare, France

[73] Assignee: Societe Prolabo, Paris, France

[21] Appl. No.: 222,385

[22] Filed: Apr. 4, 1994

Related U.S. Application Data

[63] Continuation of Ser. No. 941,437, Dec. 23, 1992, abandoned.

[30] Foreign Application Priority Data

Feb. 27, 1991 [FR] France ............... 91 02571

[51] Int. Cl.$^6$ .......................... B01L 5/00; B01D 3/10
[52] U.S. Cl. .................... 422/101; 202/186; 202/205; 202/237; 203/DIG. 2; 422/99
[58] Field of Search .......... 422/99, 101, 103; 436/181; 137/240; 251/149.1; 141/65, 67, 70, 82, 93, 285; 73/864.11; 202/237, 186, 205; 203/DIG. 2, 87, 91, 49

[56] References Cited

U.S. PATENT DOCUMENTS

| | | | |
|---|---|---|---|
| 2,020,298 | 11/1935 | Carothers et al. | 549/228 |
| 3,849,260 | 11/1974 | Ruckstuhl | 202/181 |
| 4,194,299 | 3/1980 | Wiberg et al. | 34/124 |
| 4,235,676 | 11/1980 | Chambers | 202/118 |
| 4,235,677 | 11/1980 | Karamian | 203/DIG. 2 X |
| 4,681,740 | 7/1987 | Commarmot et al. | 422/78 |
| 5,087,422 | 2/1992 | Friese et al. | 422/61 |
| 5,231,980 | 8/1993 | Filipovic et al. | 128/205.12 |

FOREIGN PATENT DOCUMENTS 2274330 1/1976 France .

*Primary Examiner*—Robert J. Warden
*Assistant Examiner*—Robert Carpenter
*Attorney, Agent, or Firm*—Burns, Doane, Swecker & Mathis

[57] ABSTRACT

A device is mountable to the opening of a receptacle in which fumes are generated. The device includes a condensation chamber into which the fumes rise and are condensed. The condensed liquid flows back into the receptacle. A tube passing through the condensation chamber and is connectable to a source of suction which causes purging air to be circulated through the receptacle by drawing purging air into the receptacle through the condensation chamber and discharging the air through the tube.

11 Claims, 3 Drawing Sheets

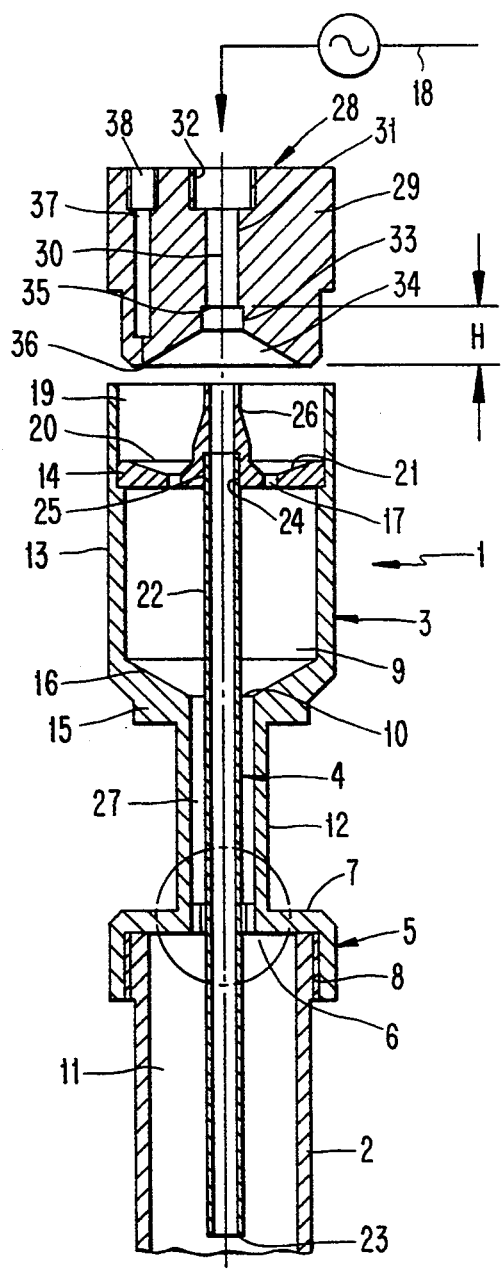
FIG. 1A
FIG. 1B
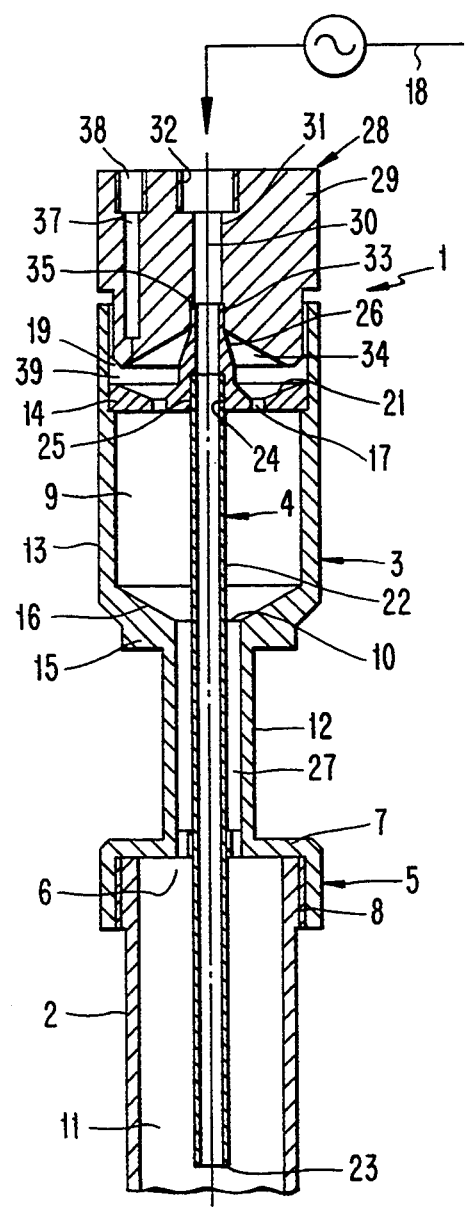
FIG. 2

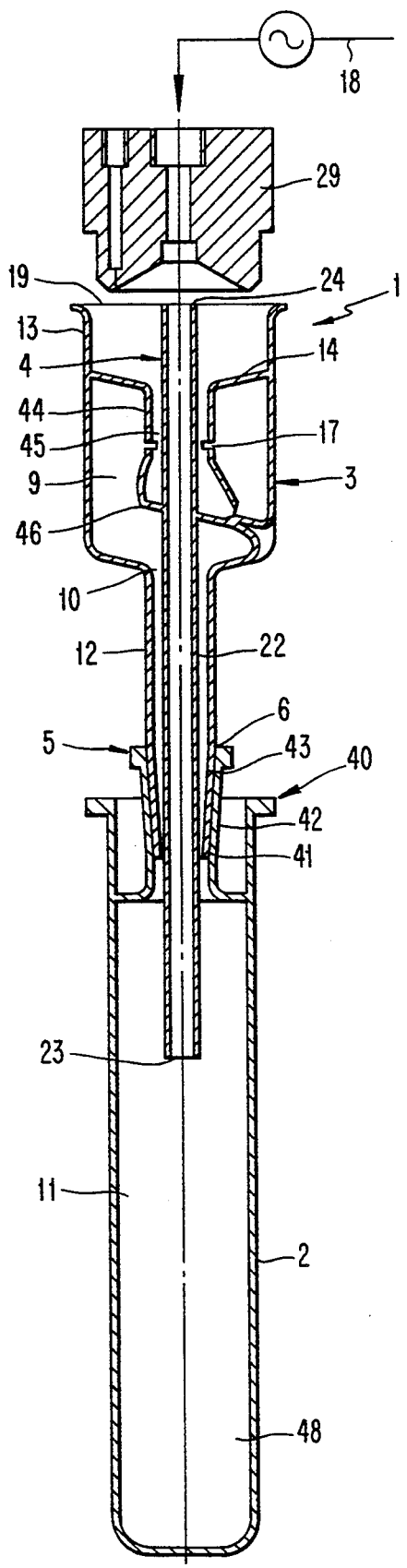
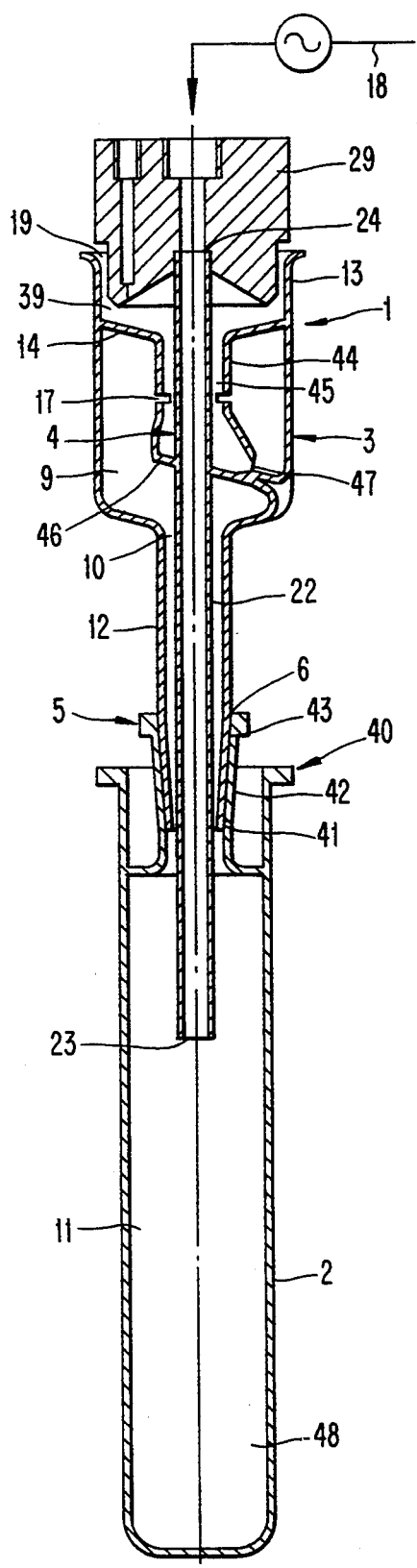

APPARATUS CONNECTIBLE TO A RECEPTACLE FOR CONDENSING FUMES GENERATED DURING CHEMICAL REACTIONS

This application is a continuation of application Ser. No. 07/941,437, filed Dec. 23, 1992, now abandoned.

BACKGROUND OF THE INVENTION

The present invention relates to a device which can be fitted to a receptacle in which a substance or a mixture of substances is to undergo a treatment which generates fumes.

"Treatment" means either that the substance or the mixture of substances undergoes a physical operation, such as dissolution, crystallisation and the like, or undergoes a chemical reaction.

The invention also relates to a reactor comprising such a device and the use of the said reactor.

In the laboratory, for example when carrying out chemical reactions which generate fumes, such as chemical reactions by the wet route, there is sometimes a need, in a first stage, to condense the fumes emitted and to recycle the condensate into the receptacle and, in a second stage, to remove at best all traces of liquid in the final substance.

In order to do this, in the first stage, a condensation device of a known type, such as a cooled coil or condensation column, is secured to the opening of the receptacle and then the operator removes this device and secures, to the opening of the receptacle, a stopper provided with a spout and comprising an orifice with which is combined a joining piece for connecting to suction means in order, in this second stage, to remove the traces of liquid contained in the final substance by purging the internal space of the receptacle with a gas.

This process is, of course, satisfactory but requires the intervention of the operator between the two stages in order to remove the device used in the condensation stage and then to refit the device used in the stage of removal of the liquid contained in the final substance.

For this reason, it is difficult to automate the carrying out of a chemical reaction comprising these two stages.

The problem is identical when the receptacle is intended to accommodate a physical operation which generates fumes.

SUMMARY OF THE INVENTION

One object of the invention is a device which can be fitted to a receptacle, especially for chemical reactions, and which allows these two operating stages to be automated.

Another object of the invention is a device which does not need to be either removed or refitted between the stage of condensation of the fumes and the stage of removal of the traces of liquid from the final substance, that is to say, a device which makes possible both these two operating stages.

There has now been found, and this is the subject of the present invention, a device which can be fitted to a receptacle, especially for chemical reactions which generate fumes, suction means being combined with the said device, characterised in that it comprises:
  means for condensing the fumes, in a first stage of use,
  means for passing the fumes directly from inside to outside the receptacle, in a second stage of use,
  means for fitting the device to the opening of the receptacle.

"Receptacle", in the present text, means any "container" conventionally used to carry out a chemical reaction or a physical operation in the laboratory. Thus, the device which is the subject of the invention can be fitted to the opening of a test tube, of a round-bottomed flask, of a matrass, and the like.

The means for fitting the device to the opening of the receptacle are means which are conventionally used. The fitting means can be of the stopper type and screwed to the end of the receptacle, the latter then comprising a threaded region. They can also be of conical shape and be inserted into the opening, also conical in shape, of the receptacle, the surfaces in contact, if the device is of glass, being ground to ensure airtightness.

The suction means combined with the device are means conventionally available in the laboratory, such as a liquid jet vacuum pump, a vacuum network which equips the laboratory, an evacuating oil vacuum pump, and the like.

The device according to the invention is such that the condensing means consist of a condensation chamber connected via first passing means to the inside of the receptacle, the said first passing means making it possible, on the one hand, for the fumes to pass from the receptacle towards the condensation chamber and, on the other hand, for the main condensate to return into the receptacle.

The condensate formed in the condensation chamber is called "main condensate".

Preferably, the condensation chamber comprises second passing means which, on the one hand, connect the suction means to the internal space of the condensation chamber in the first stage of use and, on the other hand, allow a purging gas to enter the receptacle in the second stage of use of the said device.

In the first stage of use, the second passing means connecting the suction means to the internal space of the condensation chamber facilitate the passage of the fumes emitted from the receptacle towards the condensation chamber.

Advantageously, in order that, in the first stage of use of the device, only a small quantity of fumes can escape from the condensation chamber via the second passing means, the latter have a small useful cross-section (or passage cross-section) and the useful cross-section of the second passing means is preferably less than the useful cross-section of the first passing means.

The condensation chamber can be of any shape. Preferably, the device which is the subject of the invention is such that the condensation chamber is substantially cylindrical and is delimited by a side wall and at least one top wall comprising the second passing means.

In order that, in the first stage of use of the device, the suction means act with greater efficiency through the second passing means so as to facilitate the passage of the fumes from the receptacle towards the condensation chamber, the side wall of the condensation chamber advantageously extends above the top wall in order to delimit a region of operation of the suction means.

As was said above, a small amount of fumes escapes from the condensation chamber via the second passing means during the first stage of use. These fumes may then condense on the inner surface of the region of operation of the suction means or else on the suction means themselves. Thus, in order to recover this condensate, called secondary condensate, preferably, the external surface of the top wall of the condensation chamber is shaped to constitute a region for collecting the secondary condensate and the device comprises means for returning the said condensate into the condensation chamber.

According to one embodiment of the device, according to the invention, the means for returning the secondary condensate into the condensation chamber consist of the second passing means.

In order to facilitate the condensation of the fumes in the condensation chamber, the latter can be combined with means for cooling its side wall. These cooling means can consist of a duct which blows cold air.

Advantageously, the device which is the subject of the invention can be such that the condensation chamber comprises a double jacket which delimits a chamber for circulating a coolant fluid.

The chamber for circulating the coolant fluid, of course, comprises an inlet pipe and an outlet pipe for the coolant fluid, which is most often water.

The device according to the invention can be such that the means for passing the fumes directly from inside to outside the receptacle, in the second stage of use of the device, emerge in the receptacle in the vicinity of its opening.

Preferably, the means for passing the fumes directly from inside to outside the receptacle in the second stage of use of the said device consist of a tube, one of the ends of which is immersed in the receptacle and the other end of which is intended to be connected to the suction means.

The tube is immersed in the receptacle, advantageously up to the vicinity of the surface of the final substance in order for the fumes to be carried off towards the outside of the receptacle as close as possible to their source in order to avoid any condensation on the internal surface of the receptacle.

The tube which constitutes the means for passing the fumes directly from inside to outside the receptacle preferably passes through the condensation chamber, most frequently along its axis.

In order to avoid cooling of the part of the tube situated in the condensation chamber during the second stage of use, with the danger of condensation of the fumes extracted by the purging gas, the tube is surrounded, over at least a part of its length situated in the condensation chamber, by an annular chamber delimited by a wall, which isolates the tube from the condensation chamber.

According to one embodiment of the device which is a subject of the invention, the tube which constitutes the means for passing the fumes directly from inside to outside the receptacle is detachable and passes through the top wall of the condensation chamber via an orifice, means for fixing the tube in the orifice being provided.

The means for fixing the tube in the orifice of the top wall of the condensation chamber can consist of the interaction of an orifice of conical shape, widened towards the outside of the condensation chamber, with a bulge of corresponding conical shape carried by the tube in the vicinity of that end of the tube which is intended to be connected to the suction means. The conical surfaces in contact with the orifice and/or with the bulge can be ground if the tube and/or the condensation chamber are of glass.

Such an embodiment makes it possible to adapt the length of the tube for passing the fumes directly from inside to outside the receptacle as a function of the quantity of final substance present in the receptacle in order that the end of the tube situated in the receptacle is as close as possible to the surface of the final substance, which improves the purging of the latter by a gas in order to remove the traces of liquid which it contains.

According to another embodiment, the device according to the invention is such that, between the condensation chamber and the means for fitting the device to the opening of the receptacle, the said device comprises a neck.

According to a variant, the neck is detachable and comprises means for fixing, on the one hand, to the condensation chamber and, on the other hand, to the means for fitting to the opening of the receptacle.

The presence of a neck between the condensation chamber and the means for fitting the device to the opening of the receptacle facilitates grasping of the device and/or of the assembly consisting of the device and the receptacle, in particular grasping by the claw of a handling robot.

The means for fixing a detachable neck can consist of screwing means or else, as for the tube, interaction of two conical surfaces.

The suction means can be combined with the device via a pipe which ends the suction means and is force-fitted to the end of the direct passing tube in the second stage of use of the device.

For a device comprising second passing means connecting the suction means to the condensation chamber, an end part of inverted funnel shape will be fitted to the pipe which ends the suction means in the first stage of use.

Advantageously, the device contains means for combining it with the suction means. These means make it possible, in the first stage of use, to cause the suction means to operate in the region of operation provided for this purpose above the top wall of the condensation chamber and, in the second stage of use, to directly connect the tube for passing the fumes directly from the receptacle out of the receptacle towards the suction means.

The means for combining the device with the suction means are preferably such that a simple translational movement along the axis of the device makes it possible to combine the device with the suction means for the two stages of use of the said device.

Thus, the means for combining the device with the suction means can consist of a joining piece which can be fitted to the pipe which ends the suction means. This joining piece comprises a through passage provided at one of its ends with means for connecting to the suction means, this passage emerging at its other end in a widened region, the joining piece being of such dimensions that, in the vicinity of the widened region, it can enter, with clearance, the region of operation of the suction means and such that the opening of the through passage in the widened region is tightly fitted to the end of the tube for directly passing the fumes, in the second stage of use of the device.

The opening of the through passage can also, according to another embodiment, be tightly fitted to the end of an adaptor placed on the external surface of the top wall of the condensation chamber.

According to a variant, in order to be able to introduce a substance, such as a liquid reactant, into the receptacle during the use of the device according to the invention, the joining piece comprises a pipe for passing directly from outside the joining piece towards the region of operation of the suction means. The substance introduced via the passage pipe enters the condensation chamber via the second passing means provided in the top wall of the latter and then runs down into the receptacle via the first passing means.

All the parts of the device according to the invention which may come into contact with the substances being treated and/or with the fumes generated by the treatment are advantageously made of material which is highly corrosion-resistant, since the substances being treated, especially those used for chemical reactions via the wet route, are particularly aggressive and the temperature reached in the receptacles is high. Glass and polytetrafluoroethylene are generally highly suitable materials.

A receptacle combined with a device such as described above can constitute a reactor for a chemical reaction, the reaction mixture being contained in the receptacle. Such a reactor makes it possible, in a first stage of use, to condense the fumes emitted and to recycle the condensate into the reaction mixture and, in a second stage, to remove the greater part of the liquid contained in the final substance of the reaction.

Such a reactor can be heated by conventional means, such as, for example, a heating bath. However, such a reactor is more particularly intended to be subjected to microwave heating, the receptacle being placed in a cavity for application of the microwaves which is connected to a waveguide in which a generator transmits.

DESCRIPTION OF THE DRAWINGS

The invention will be better understood through the description of the appended figures which represent, schematically, by way of example and without specified scale, various embodiments of the device and of the reactor which are the subject of the present invention.

FIG. 1A is a sectional view, through a vertical plane of symmetry, of a device and of a joining piece according to one embodiment, positioned for the first stage of use.

FIG. 1B is an enlargement of a portion indicated by a circle in FIG. 1A.

FIG. 2 is a sectional view, through a vertical plane of symmetry, of the device and of the joining piece according to FIG. 1, positioned for the second stage of use.

FIG. 3 is a sectional view, through a vertical plane of symmetry, of a reactor formed by a device according to another embodiment combined with a receptacle and with a joining piece according to FIG. 1, positioned for the first stage of use.

FIG. 4 is a sectional view, through a vertical plane of symmetry, of the reactor according to FIG. 3 during the second stage of use.

DESCRIPTION OF PREFERRED EMBODIMENTS OF THE INVENTION

Figure 5:
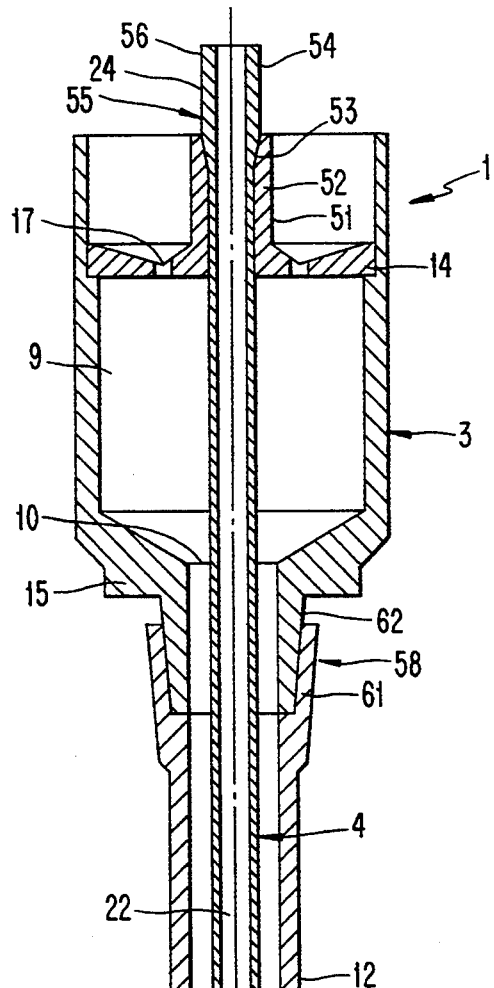
FIG. 5 is a sectional view, through a vertical plane of symmetry, of a device according to yet another embodiment.

The device or member (1) forming the subject of the invention, which can be fitted to a receptacle (2) and is represented in section through a vertical plane of symmetry in FIGS. 1 and 2 in its two stages of use, comprises:

means (3) for condensing the fumes, which are used in the first stage, means (4) for passing the fumes directly from inside (11) to outside the receptacle (2), which are used in the second stage, means (5) for fitting to the opening (6) of the receptacle (2).

According to the embodiment represented, the fitting means (5) are of the stopper type (7) and are fixed by screwing to that end of the receptacle (2) which is provided on its external surface with a threaded region (8).

The means (3) for condensing the fumes includes a first conductor which consist of a condensation chamber (9) connected via first passing means (10) to the inside (11) of the receptacle (2). The first passing means (10) make it possible, on the one hand, for the fumes to pass from the receptacle (2) towards the condensation chamber (9) and, on the other hand, for the main condensate to return from the condensation chamber (9) towards the receptacle (2).

The condensation chamber (9) is substantially cylindrical and bounded by a side wall (13), a top wall (14) and a bottom wall (15) which carries the first passing means (10).

Advantageously, the internal surface (16) of the bottom wall (15) is frustoconical in shape, the virtual top of the cone being situated towards the bottom so as to facilitate the collection and the running down of the main condensate towards the first passing means (10).

According to this embodiment, the top wall (14) of the condensation chamber (9) comprises second passing means (17) consisting of holes. As will be described below, these second passing means (17) connect the suction means (18) to the internal space of the condensation chamber (9) in the first stage of use of the device (1) on the one hand and, on the other hand, allow a purging gas to enter the receptacle (2) in the second stage of use of the device (1).

These second passing means (17) can also be used to return a secondary condensate into the condensation chamber (9).

The useful cross-section, that is to say the passage cross-section, of the second passing means (17), is preferably less than the useful cross-section of the first passing means (10).

In order to facilitate the recovery of the secondary condensate and to direct it towards the second passing means (17), the external surface (20) of the top wall (14) of the condensation chamber (9) is shaped in order to constitute a region for collecting the secondary condensate. The external surface (20) consists of two sloping surfaces delimiting an annular trough (21), the second passing means (17) being situated in the bottom part of the latter and constituting the means for returning the secondary condensate into the condensation chamber (9).

According to the present embodiment of the device (1), the side wall (13) of the condensation chamber (9) extends above the top wall (14) of the latter in order to delimit a cavity or region of operation (19) of the suction means (18). This region of operation (19) enables the suction means (18) to operate with greater efficiency through the second passing means (17) in order to facilitate the passage of the fumes from the receptacle (2) towards the condensation chamber (9).

According to the embodiment represented, the device (1) comprises, between the condensation chamber (9) and the fitting means (5), a tubular neck (12) fitted to the lower part of the condensation chamber (9), the first passing means (10) emerging in the hollow part of the neck (12).

The device (1) which is the subject of the invention comprises means (4) for passing fumes directly from inside (11) to outside the receptacle (2) in the second stage of use of the device 1. That means (4) comprises a second conductor consisting of a tube (22) whose end (23) is immersed in the receptacle (2) and whose other end (24) is intended to be connected to the suction means (18).

According to the embodiment represented, the end (24) of the tube (22) is inserted into an orifice (25) in the top wall (14) of the condensation chamber (9), this orifice (25) being provided on the external surface (20) of the top wall (14) with an adaptor (26) to facilitate the connection of the tube (22) to the suction means (18).

The tube (22) for passing the fumes directly is immersed in the receptacle (2) up to the vicinity of the surface of the final product contained in the receptacle (2) in order for the fumes of the liquid present in the final product to be removed as close as possible to their source in order to avoid any risk of condensation on the walls of the receptacle (2).

The tube (22) for passing the fumes directly passes through the condensation chamber (9) and then passes into the tubular neck (12). The external dimensions of the tube (22) and the internal dimensions of the neck (12) are chosen so that an annular passage (27) is made between the two and so that the useful cross-section of this annular passage (27) is at least equal to the useful cross-section of the first passing means (10).

The tube (22) passes through the top wall (73) of the fitting means (5) of the stopper type (7) via an orifice (74) whose dimension is such that the tube (22) enters the orifice (74) by force, which ensures that the tube (22) is held in position (cf. detail a). Of course, the top wall (73) region of the stopper (7) is provided with a plurality of holes (75) which ensure that the fumes pass from the receptacle (2) towards the condensation chamber (9) and that the main condensate passes from the condensation chamber (9) towards the receptacle (2) in the first stage of use, and that the purging gas passes from outside the device (1) towards the receptacle (2) in the second stage of use. Advantageously, the useful cross-section of the holes (75) is greater than the useful cross-section of the first passing means (10).

The device (1) represented in FIGS. 1 and 2 comprises means (28) for combining the device (1) with the suction means (18) represented schematically.

According to the present embodiment, the means (28) consist of an element in the form of a joining piece (29) which can be fitted to the pipe which connects to the suction means (18).

The joining piece (29) is substantially of cylindrical shape and it comprises a third conductor in the form of a through passage (30) provided at one end (31) with means (32) for connecting to the suction means (18). The connecting means (32) can consist of a threaded region which allows a connector to be fixed on.

At its other end (33), which is the end situated closest to the region of operation (19) of the suction means (18), the through passage (30) emerges in a recess or widened region (34). The widened region (34) is of frustoconical shape and the through passage (30) emerges at the top center of the widened region (34). The opening of the through passage (30) at the top of the widened region (34) is of such dimensions that the tube (22) for passing the fumes directly can be tightly fitted to the through passage (30), for example by entering the latter or, as represented in FIG. 2, it is the adaptor (26) which enters the through passage (30), the latter having, in the vicinity of its end (33), a greater diameter which delimits an end stop (35) for the adaptor (26).

The joining piece (29) of cylindrical shape is, at least in the vicinity of the widened region (34), of such dimensions that it can enter with clearance (39) into the region of operation (19) of the suction means (18), as represented in FIG. 2. Thus, the diameter of the joining piece (29) in the vicinity of the widened region (34) is less than the internal diameter of the region of operation (19) of the suction means (18) and the distance H between the end stop (35) and the face (36) of the joining piece (29) is such that the face (36) of the joining piece (29) is not in contact with the external surface (20) of the top wall (14) of the condensation chamber (9) when the joining piece (29) is inserted over the adaptor (26).

The clearance (39) maintained between the joining piece (29) and the walls of the region of operation (19) of the suction means (18) makes it possible, in the second stage of use, for the purging gas to enter the receptacle (2) via the second passing, means (17), the purging gas passing through the condensation chamber (9), the first passing means (10) and then the annular passage (27) made between the tube (22) and the neck (12).

According to the embodiment represented, the joining piece (29) has a pipe (37) for passing directly from outside the joining piece (29) towards the region of operation (19) of the suction means (18). The pipe (37) is preferably equipped with a threaded region (38) which allows a connector to be fitted.

This pipe (37) is intended to introduce a substance, such as a fluid, into the receptacle (2) while an operation is taking place in the latter. Indeed, the substance introduced via the pipe (37) enters the condensation chamber (9) via the second passing means (17) and then runs down towards the receptacle (2) via the first passing means (10) and the annular passage (27).

There will now be described, with reference to FIGS. 1 and 2, the operation of the device which is the subject of the invention in its two stages of use. Beforehand, the suction means (18) are connected via a pipe equipped with a connector screwed into the threaded region of the means of connection (32).

In the first stage of use, as represented in FIG. 1, the joining piece (29) intended to combine the device (1) with the suction means (18) is not inserted into the region of operation (19) of the suction means (18).

The suction means (18) act via the widened region (34) over the entire surface of the region of operation (19) and the low suction effect transmitted by the second passing means (17) into the condensation chamber (9) makes it easier for the fumes which are emitted in the receptacle (2) and rise towards the condensation chamber (9) to ascend into the latter via the annular passage (27) and the first passing means (10).

In the condensation chamber (9), the fumes condense and their condensate, called main condensate, is recycled into the receptacle (2) via the first passing means (10) and the annular passage (27).

Of course, a small quantity of the fumes emitted in the receptacle (2) on the one hand rises via the direct passing tube (22) and, on the other hand, leaves the condensation chamber (9) via the second passing means (17). This small quantity of fumes most frequently condenses on the walls of the region of operation (19) of the suction means (18) or on the surface of the widened region (34). This secondary condensate is recovered in the annular trough (21) and then runs down into the condensation chamber (9) via the second passing means (17) and is recycled into the receptacle (2) with the main condensate.

Of course, if necessary, a substance can be introduced into the receptacle (2) via the pipe (37) during the first stage of use.

In the second stage of use, as represented in FIG. 2, the joining piece (29) intended to combine the device (1) with the suction means (18) is moved in translation along the axis of the device (1), for example automatically by the claw of a robot.

The joining piece (29) is inserted into the region of operation (19) of the suction means (18) until the adaptor (26) comes into contact with the end stop (35) of the through passage (30). Thus, the means (4) for passing the fumes directly from the receptacle (2) towards the suction means (18) are directly connected to the latter by the through passage (30).

The suction means (18) thus draw off the fumes emitted in the receptacle (2). The entry of purging gas into the receptacle (2), from the ambient atmosphere via the clearance (39) between the joining piece (29) and the region of operation (19) of the purging means (18), the second passing means (17), the condensation chamber (9), the first passing means (10) and the annular passage (27), makes it possible to carry off the traces of liquid present in the final product contained in the receptacle (2) and makes it possible to collect a practically dry final product.

FIGS. 3 and 4 represent a reactor (40), which is also the subject of the invention and is formed by a device (1) according to another embodiment combined with a receptacle (2).

The reactor (40) essentially comprises:
a substantially tubular receptacle (2) provided with an opening (6) in the form of a neck (41), whose internal face (42) is conical and has a ground surface,
a device (1) which consists of:
  means (3) for condensing the fumes used in the first stage, formed by a condensation chamber (9),
  means (4) for passing the fumes directly from inside (11) to outside the receptacle (2), consisting of a tube (22) and which are used in the second stage,
  means (5) for fitting to the opening (6) of the receptacle (2),
  means (28) for combining the device (1) with the suction means (18), represented schematically, consisting of a joining piece (29).

The joining piece (29) is analogous to that represented in FIGS. 1 and 2 and will not be specifically described.

According to the embodiment represented, the means (5) for fitting the device (1) to the opening (6) in the form of a neck (41) are formed by a conical region (43), of ground surface, which is fitted to the internal face (42) of the neck (41) of the receptacle (2). The conical region (43) is situated at the end opposite the condensation chamber (9) of the neck (12) of the device (1).

The condensation chamber (9), like the condensation chamber (9) of the device (1) represented in FIGS. 1 and 2, is connected by first passing means (10) to the inside (11) of the receptacle (2).

The top wall (14) of the condensation chamber (9) according to this embodiment slopes from the side wall (13) of the region of operation (19) of the suction means (18) towards the vertical axis of the device (1) without however reaching the wall of the tube (22) for passing of the fumes directly from the receptacle (2) towards the suction means (18). The top wall (14) is extended, in the vicinity of the tube (22) by a substantially cylindrical wall (44) which delimits an annular space (45) around the tube (22) and the annular space (45) is closed at its bottom part via a sloping wall (46) which makes it possible for the secondary condensate to run down through a hole (47) made between the wall (44) and the region situated at the lowest point of the sloping wall (46).

The substantially cylindrical wall (44) which delimits the annular space (45) comprises holes which form the second passing means (17).

A device (1) according to the embodiment represented in FIGS. 3 and 4, and which is the subject of the invention, consists of a single piece and it can be made of glass.

The two stages of use of the device (1) described above are analogous to those described for the embodiment represented in FIGS. 1 and 2.

However, there will be described the progress of a chemical reaction, for example a mineralisation, in a reactor (40) which is also a subject of the invention, consisting of a device (1) combined with a receptacle (2).

The substance and the acid which allows the substance to be chemically attacked are placed in the receptacle (2). The device (1) is secured to the opening (6) of the receptacle (2) by inserting the conical region (43) of the device (1) into the conical region (42) of the neck (41) of the receptacle (2). The joining piece (29) is combined with the device (1) as represented in FIG. 3.

The receptacle (2) is heated, in its bottom part (48) containing the reaction mixture, by suitable heating means. Preferably, the bottom part (48) of the receptacle (2) is placed in a cavity for application of the microwaves which is connected to a waveguide, such as described in French Patent No. 84/03496.

During this heating stage, the acid fumes formed rise and come into the condensation chamber (9) where they condense. The main condensate and, if appropriate, the secondary condensate are recycled into the receptacle (2), running down via the first passing means (10) in order to participate again in the chemical reaction.

When the chemical reaction is finished, the joining piece (29) is introduced into the region of operation (19) of the suction means (18) until the tube (22) is inserted into the joining piece (29) as represented in FIG. 3.

While the receptacle (2) containing the final product continues to be heated, purging air enters via the clearance (39) between the joining piece (29) and the walls (13) and (14) of the condensation chamber (9) under the action of the suction means (18), enters the condensation chamber (9) the second passing means (17), descends into the receptacle (2) and rises again via the tube (22) towards the suction means (18), carrying off the fumes of the liquid contained in the final substance. It is thus possible to partially or even totally remove the acids still present in the final product.

The device (1) and according to the embodiment represented in section through a vertical plane of symmetry in FIG. 5, which is the subject of the invention, comprises:

means (3) for condensing the fumes, consisting of a condensation chamber (9) analogous to that of the device represented in FIG. 1, means (4) for passing the fumes directly from inside (11) to outside the receptacle (2), consisting of a tube (22), means (5) for fitting to the opening (6) of the receptacle (2), a neck (12) between the condensation chamber (9) and the fitting means (5).

According to the present embodiment, the tube (22) constituting the means (4) for passing the fumes directly from inside (11) to outside the receptacle (2) is detachable. The tube (22) passes through the top wall (14) of the condensation chamber (9) via an orifice (51) flanged on the external face of the top wall (14) via a tubular collar (52) whose internal surface (53) is of conical shape, at least in the vicinity of that end of the collar (52) which is furthest from the top wall (14). The internal surface (53) preferably has a ground appearance.

In the vicinity of its end (24) situated outside the receptacle (2), the tube (22) has a bulge (54) of conical shape corresponding to the conical internal surface (53) of the=collar (52). The bulge (54) of conical shape preferably has a surface with a ground appearance.

The means (55) for fixing the tube (22) in the orifice (51) of the top wall (14) of the condensation chamber (9) thus consist of the interaction of the conical internal surface (53) of the orifice (51) and of the conical external surface of the bulge (54).

The tube (22) advantageously has above the bulge (54) of conical shape a cylindrical external surface region (56) for connecting the tube (22) to the suction means (18).

According to the present embodiment, the neck (12) between the condensation chamber (9) and the fitting means (5) is also detachable.

The neck (12) comprises means (57, 58) for fixing respectively to the stopper (7) for fitting the device (1) to the receptacle (2) and to the condensation chamber (9).

The fixing means (57) consist of a male conical region (59), carried by the neck (12), which fits into a female conical region (60) carried by the stopper (7).

The fixing means (58) analogously consist of a female conical region (61), carried by the tube (22), which fits into a male conical region (62) carried by the bottom wall (15) of the condensation chamber (9).

In order to ensure airtightness and secure fixing of the stopper (7), the neck (12) and the condensation chamber (9) to each other, the conical regions (59, 60, 61, 62) have surfaces of ground appearance.

The conical regions (59, 60, 61, 62) of the fixing means (57, 58) can, of course, be replaced by threaded regions, and the stopper (7), the neck (12) and the condensation chamber (9) will then be put together by screwing.

According to the present embodiment, since the tube (22) may be very long, the stopper (7) advantageously has a support (67) such as that represented in detail a) in FIG. 1.

A device (1) whose tube (22) and/or neck (12) are detachable makes it possible to adapt the length of the tube (22) to the quantity of final product present in the receptacle (2) in order that the tube (22) emerges as close as possible to the surface of the final product.

Moreover, the choice of the length of the neck (12) makes it possible to facilitate the handling of the device by a robot.

Figure 6:
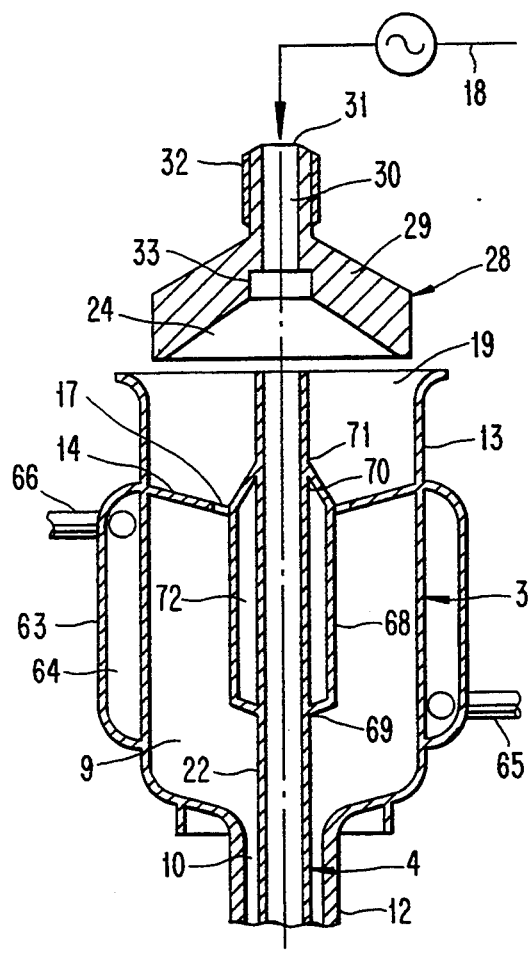
FIG. 6 is a partial view, in section through a vertical plane of symmetry, of a device and of a joining piece according to another embodiment.

The device (1) according to the invention, of which a partial view in section through a vertical plane of symmetry is represented in FIG. 6, has a condensation chamber (9) which also comprises first passages (10) and second passages (17). However, according to the present embodiment, the condensation chamber (9) comprises a double jacket (63) which delimits a chamber (64) for circulating a coolant fluid. The circulation chamber (64) comprises an inlet pipe (65) and an outlet pipe (66) for the coolant fluid. Water is often used as coolant fluid.

The circulation of fluid in the circulation chamber (64) promotes the condensation of the fumes in the condensation chamber (9).

As in the case of the condensation chamber (9) of the device (1) represented in FIG. 3, the top wall (14) slopes from the side wall (13) of the region of operation (19) of the suction means (18) towards the vertical axis of the device (1) without reaching the wall of the tube (22). The top wall (14) is extended downwards by a substantially cylindrical wall (68) which bends until it comes into contact at (69) with the tube (22); it is extended upwards by a sloping wall (70) which comes into contact with the tube (22) at (71). The walls (68) and (70) delimit an annular chamber (72) around the tube (22).

This annular chamber (72) isolates the tube (22) from the stream of air caused, in the second stage of use of the device (1), by the entry of the air via the second passages (17) into the condensation chamber (9).

If the device (1) is not made of a single piece, the openings at (71) and (69) of the annular chamber (72) are of such dimensions that the tube (22) enters by force, which ensures that the tube (22) is held in position.

The device (1) comprises means (28) for combining the device with the suction means (18) represented schematically; these means (28) consist of a joining piece (29).

The joining piece (29) comprises a through passage (30) provided at one end (31) with a threaded external surface (32) which allows a connector to be fixed on. At its other end (33), the through passage (30) emerges in a frustoconical widened region (34).

In the vicinity of the widened region (34), the through passage (30) has a greater diameter intended to create an end stop (35) for the tube (22) for passing the fumes directly from inside (11) to outside the receptacle (2).

The joining piece (29) thus has substantially a funnel shape, and is of such dimensions that, in the second stage of use of the device (1) according to the invention, it can be inserted into the region of operation (19) of the suction means (18) and such that the end (24) of the tube (22) comes into contact with the end stop (35).

Figure 7:
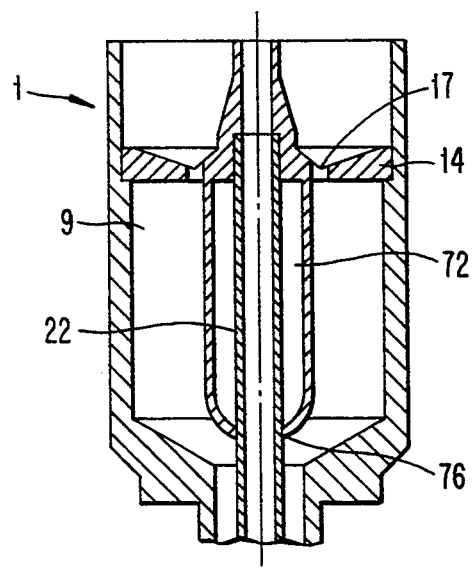
FIG. 7 is a partial view, in section through a vertical plane of symmetry, of another embodiment of the device.

The device (1) according to the embodiment represented partially, in section through a vertical plane of symmetry, in FIG. 7, comprises an annular chamber (72) whose wall (68) is integral with the top wall (14) of the condensation chamber (9).

The annular chamber (72) has in its bottom part a hole (76) intended for the passage of the tube (22). The dimensions of the hole (76) are such that the tube (22) enters by force, which contributes to keeping the tube (22) in position.

The annular chamber (72) is substantially cylindrical and surrounds the tube (22) over practically all its length situated in the condensation chamber (9) in order to isolate the tube (22) from the stream of air caused in the second stage of use of the device (1) by the entry of the purging air via the second passages (17) into the condensation chamber (9). This isolation of the tube (22) throughout practically the whole of its passage through the condensation chamber (9) prevents the condensation of liquid on the internal face of the tube (22) in the second stage of use.

Of course, the invention is in no way limited to the various embodiments described specifically in the present description and variants or improvements relating to the various means used can be adopted without, however, leaving the scope of the invention.

Without leaving the scope of the invention, it is also possible to combine together two or more embodiments or variants described above as examples and which are in no way limiting.

The device which can be fitted to a receptacle, especially for a chemical reaction which generates fumes, has advantages. On the one hand, it make possible the condensation of the fumes and the recycling of the condensate into the receptacle during the progress of the reaction, which avoids the use of a large quantity of reactant. On the other hand, it makes it possible to remove practically all traces of liquid from the final product contained in the receptacle.

The device which is a subject of the invention and to which a receptacle is fitted can be intended for carrying out physical operations such as dissolution, melting or crystallisation of a substance or of a mixture of substances.

The reactor, which is also a subject of the invention, consisting of a device to which a receptacle is fitted, can also be intended for carrying out chemical reactions, especially by the wet route, on a substance or a mixture of substances. The reactor thus constituted, by combination of the device and of the receptacle, is particularly intended for carrying out reactions such as the acid or alkaline treatment of samples via the wet route for the purposes of dissolution, hydrolysis or mineralisation.

We claim:

1. Apparatus for condensing fumes generated in a receptacle during a first operating period, and for thereafter purging liquid from the receptacle during a second operating period, said apparatus comprising: a member having a lower end mountable to a receptacle, said member including:
   a condensation chamber and first fluid conducting means for connecting said condensation chamber to the inside of the receptacle, said first fluid conducting means comprising a first tube disposed between a lower portion of the condensation chamber and the receptacle, said first tube conducting fumes from the receptacle towards the condensation chamber, and conducting a main condensate formed in said condensation chamber during a first operating period back to said receptacle, the condensation chamber comprising holes disposed in an upper portion of the condensation chamber and communicating with a cavity defined by a wall of said first tube situated above the condensation chamber, said holes defining passage means for returning a secondary condensate produced in said cavity back to the condensation chamber
   second fluid conducting means for conducting fumes directly from inside to outside the receptacle during a second operating period, said second fluid conducting means comprising a second tube having a lower end immersed in the receptacle and an upper end emerging upwardly outside of the condensation chamber, said second tube passing through said first tube and then through the condensation chamber;
   a source of suction;
   an element disposed at an upper end of said member above said passage means of the condensation chamber and including third fluid conducting means for communicating said source of suction with said upper end of said second fluid conducting means during the second operating period, said third fluid conducting means communicating with said source of suction, said element and said member being relatively movable between a first relative position during the first operating period, in which said third fluid conducting means is out of direct communication with the upper end of said second tube, and a second relative position during the second operating period, in which said element is disposed in said cavity such that said third fluid conducting means is in direct communication with said upper end of said second tube for drawing-up fumes directly from the inside of the receptacle through said second tube; and
   fourth fluid conducting means for conducting purge gas from a source of purge gas to said passage means for successive travel through said condensation chamber, said first tube, said receptacle, and said second tube.

2. Apparatus according to claim 1, wherein said passage means constitutes first passage means, said first tube includes a neck having means at a lower end thereof for mounting said member to said receptacle and second passage means communicating with the inside of the condensation chamber and emerging in a hollow upper part of the neck, said condensation chamber being of larger cross section than said second passage means.

3. Apparatus according to claim 2, wherein said member includes a fixing element removably mounted on a lower end of said neck, said fixing element being removably mountable to a receptacle.

4. Apparatus according to claim 2, wherein said second tube extends into said neck, through said second passage means and then through said condensing chamber, said source of suction being communicable with an upper end of said second tube.

5. Apparatus according to claim 2, wherein said condensation chamber includes a substantially cylindrical side wall and a top wall, said second passage means communicating with a lower portion of said condensation chamber, said first passage means being formed in said top wall.

6. Apparatus according to claim 2, wherein first passage means is of smaller cross section than said second passage means.

7. Apparatus according to claim 5, wherein a top surface of said top wall defines a floor of said cavity and is inclined downwardly toward said first passage means for returning, to said condensation chamber, said secondary condensate formed in said cavity.

8. Apparatus according to claim 1, wherein said member includes a coolant-conducting chamber disposed around a portion of said first tube for promoting condensation of the fumes.

9. Apparatus according to claim 1 including an isolating chamber disposed around at least a portion of said second tube for isolating said second tube from said first tube.

10. Apparatus according to claim 1, wherein said member includes a wall arranged coaxially relative to said first tube and defining said cavity, said element being guided by said wall for movement relative to said cavity in a direction parallel to an axis of said first tube between said first and second positions.

11. Apparatus according to claim 1, wherein an upper end of said first tube communicates with ambient atmosphere in both of said first and second positions.

* * * * *